(12) United States Patent
Romano et al.

(10) Patent No.: US 10,049,460 B2
(45) Date of Patent: Aug. 14, 2018

(54) IDENTIFYING AN OBJECT IN A VOLUME BASED ON CHARACTERISTICS OF LIGHT REFLECTED BY THE OBJECT

(71) Applicant: Facebook, Inc., Menlo Park, CA (US)

(72) Inventors: Nitay Romano, Geva Binyamin (IL); Nadav Grossinger, Karmei Yosef (IL)

(73) Assignee: Facebook, Inc., Menlo Park, CA (US)

( * ) Notice: Subject to any disclaimer, the term of this patent is extended or adjusted under 35 U.S.C. 154(b) by 170 days.

(21) Appl. No.: 15/052,638

(22) Filed: Feb. 24, 2016

(65) Prior Publication Data

US 2016/0253821 A1    Sep. 1, 2016

Related U.S. Application Data

(60) Provisional application No. 62/120,440, filed on Feb. 25, 2015.

(51) Int. Cl.
*G06T 7/194*    (2017.01)
*G06T 7/20*    (2017.01)
(Continued)

(52) U.S. Cl.
CPC ............ *G06T 7/2033* (2013.01); *G06F 3/017* (2013.01); *G06T 7/11* (2017.01); *G06T 7/194* (2017.01);
(Continued)

(58) Field of Classification Search
CPC ... G01B 11/25; G01B 11/2513; G01B 11/254; G06K 9/2036; G06K 9/00201; G06K 9/00362; G06K 9/00375; G06K 2209/401; G06T 2207/10028; G06T 2207/30196; G06T 7/521; G06T 15/506; G06T 15/50; G06T 7/75; G06T 7/194; G06T 7/50; G06T 7/254; G06T 2200/08; G06T 2200/04;
(Continued)

(56) References Cited

U.S. PATENT DOCUMENTS 5,638,220 A    6/1997 Ohtomo et al.
6,674,893 B1 *    1/2004 Abe .................... G01B 11/2527
                                                  356/610
(Continued)

FOREIGN PATENT DOCUMENTS

JP    2000-267800    9/2000
WO    WO 2008/087652 A2    7/2008
(Continued)

OTHER PUBLICATIONS

European Patent Office, Search Report and Opinion, European Patent Application No. 10818488.8, dated Jun. 30, 2015, eight pages.
(Continued)

*Primary Examiner* — Carol Wang
(74) *Attorney, Agent, or Firm* — Fenwick & West LLP

(57) ABSTRACT

An object is identified or tracked within a volume by projecting a light beam encoded with one or more predefined properties to have a predefined optical structure into the volume. A detector captures light from the predefined optical structure reflected from the volume. By analyzing one or more characteristics of light from the predefined optical structure reflected from the object, the object is segmented from the volume.

21 Claims, 18 Drawing Sheets

(51) Int. Cl.
*G06F 3/01* (2006.01)
*G06T 7/521* (2017.01)
*G06T 7/11* (2017.01)

(52) U.S. Cl.
CPC .... *G06T 7/521* (2017.01); *G06T 2207/30196* (2013.01)

(58) Field of Classification Search
CPC . G06T 2207/10152; G06T 2207/20224; G06T 7/11; G06T 5/50; G06T 17/00; G06F 3/017; G06F 3/0325
See application file for complete search history.

(56) References Cited

U.S. PATENT DOCUMENTS

| | | | |
|---|---|---|---|
| 6,765,608 B1* | 7/2004 | Himeda | H04N 5/232 348/14.01 |
| 7,176,440 B2 | 2/2007 | Cofer et al. | |
| 7,227,893 B1* | 6/2007 | Srinivasa | G06K 9/00771 348/155 |
| 7,440,590 B1 | 10/2008 | Hassebrook et al. | |
| 8,264,536 B2 | 9/2012 | McEldowney | |
| 8,766,952 B2 | 7/2014 | Lee et al. | |
| 2002/0181742 A1 | 12/2002 | Wallace et al. | |
| 2004/0108990 A1 | 6/2004 | Lieberman et al. | |
| 2005/0219552 A1 | 10/2005 | Ackerman et al. | |
| 2007/0120834 A1 | 5/2007 | Boillot | |
| 2007/0242857 A1* | 10/2007 | Yamamoto | G07D 7/12 382/112 |
| 2008/0062123 A1 | 3/2008 | Bell | |
| 2008/0088588 A1 | 4/2008 | Kitaura | |
| 2008/0256494 A1 | 10/2008 | Greenfield | |
| 2008/0312866 A1* | 12/2008 | Shimomura | G01B 11/25 702/155 |
| 2008/0317332 A1 | 12/2008 | Ivanov et al. | |
| 2009/0002342 A1 | 1/2009 | Terada et al. | |
| 2009/0016572 A1 | 1/2009 | Hassebrook et al. | |
| 2009/0027337 A1 | 1/2009 | Hildreth | |
| 2009/0167682 A1 | 7/2009 | Yamashita et al. | |
| 2009/0189858 A1 | 7/2009 | Lev et al. | |
| 2009/0195659 A1 | 8/2009 | Nagata et al. | |
| 2009/0279807 A1* | 11/2009 | Kanamorl | G02B 5/3025 382/274 |
| 2009/0295927 A1* | 12/2009 | Ohtake | G06K 9/00234 348/207.1 |
| 2009/0322673 A1 | 12/2009 | Cherradi El Fadili | |
| 2010/0182311 A1* | 7/2010 | Kim | G01B 11/25 345/419 |
| 2010/0189372 A1 | 7/2010 | Chen et al. | |
| 2011/0019056 A1 | 1/2011 | Hirsch et al. | |
| 2011/0080471 A1 | 4/2011 | Song et al. | |
| 2011/0211044 A1 | 9/2011 | Shpunt et al. | |
| 2011/0254810 A1 | 10/2011 | Lee et al. | |
| 2011/0287387 A1 | 11/2011 | Chen et al. | |
| 2012/0147187 A1* | 6/2012 | Li | G06K 9/3233 348/148 |
| 2012/0162140 A1 | 6/2012 | Lee et al. | |
| 2012/0194561 A1 | 8/2012 | Grossinger et al. | |
| 2012/0320092 A1 | 12/2012 | Shin et al. | |
| 2013/0155417 A1* | 6/2013 | Ohsawa | G01B 11/2536 356/610 |
| 2013/0158947 A1* | 6/2013 | Suzuki | G01B 11/00 702/155 |
| 2013/0222427 A1 | 8/2013 | Heo et al. | |
| 2013/0321585 A1 | 12/2013 | Hassebrook et al. | |
| 2014/0346334 A1 | 11/2014 | Grossinger et al. | |
| 2015/0042680 A1 | 2/2015 | Grossinger et al. | |
| 2015/0116460 A1* | 4/2015 | Jouet | H04N 13/0271 348/46 |
| 2015/0310670 A1 | 10/2015 | Grossinger | |
| 2015/0317037 A1 | 11/2015 | Suzuki | |
| 2015/0338923 A1 | 11/2015 | Grossinger et al. | |
| 2015/0348313 A1* | 12/2015 | Fuchikami | G06T 15/20 348/333.01 |
| 2016/0163037 A1* | 6/2016 | Dehais | G06T 7/0004 382/110 |
| 2016/0179188 A1 | 6/2016 | Grossinger et al. | |
| 2016/0277719 A1* | 9/2016 | Tan | G06F 3/0426 |

FOREIGN PATENT DOCUMENTS

| | | |
|---|---|---|
| WO | WO 2009/018161 | 2/2009 |
| WO | WO 2011/036618 | 3/2011 |

OTHER PUBLICATIONS

Japan Patent Office, Office Action, Japanese Patent Application No. 2012-530394, dated Jan. 15, 2016, six pages.
Notice of Reason for Rejection dated Mar. 7, 2014 From the Japanese Patent Office Re. Application No. 2012-530394 and Its Translation Into English.
International Search Report and the Written Opinion dated Jun. 16, 2011 From the International Searching Authority Re. Application No. PCT/IB2010/054228.
PCT International Search Report and Written Opinion, PCT Application No. PCT/US2016/019377, dated Jul. 15, 2016, 13 pages.
Canadian Intellectual Property Office, Office Action, Canadian Patent Application No. 2,977,374, dated Feb. 28, 2018, five pages.
European Patent Office, Search Report and Opinion, European Patent Application No. 16756288.3, dated Oct. 23, 2017, seven pages.
Koninckx, T.P. et al., "Real-Time Range Acquisition by Adaptive Structured Light," *IEEE Transaction on Pattern Analysis and Machine Intelligence*, Mar. 20, 2006, pp. 432-445, vol. 28, No. 3, IEEE Computer Society, USA.

* cited by examiner

IDENTIFYING AN OBJECT IN A VOLUME BASED ON CHARACTERISTICS OF LIGHT REFLECTED BY THE OBJECT

CROSS REFERENCE TO RELATED APPLICATIONS

This application claims the benefit of U.S. Provisional Application No. 62/120,440, filed on Feb. 25, 2015, which is incorporated by reference in its entirety.

BACKGROUND

The present invention, in some embodiments thereof, relates to object recognition and, more particularly, but not exclusively, to a system and method using optical projections onto a scene, for example to detect and track an object such as a user hand in three dimensions (3D).

Various methods allow users to remotely control certain devices. For example, predefined gestures or postures of a user's body parts (e.g., arms, legs) may control a device. In methods using gestures or postures for device control, a gesture is identified when a user's body part aligns with a specified position, and a computer or other device performs a function or performs an action corresponding to the identified gesture.

In some embodiments, gestures by a user are identified by capturing images or video of the user via an image capture device and analyzing multiple pixels in the images or in the video data. Conventional gesture detection methods analyze a pixel in an image by comparing the pixel's color values with color values of other pixels in proximity to the pixel. Hence, these conventional methods are dependent on a significant difference in color values between a body part of the user and objects in the background of the image.

Other methods for gesture detection form a skeleton model of one or more body parts of the user (e.g., a three dimensional model of a user's hand) and analyze the skeleton model to identify gestures by the user. Alternative methods for gesture detection use a three-dimensional depth map where each pixel includes a distance between a depth camera and a portion of an object corresponding to a pixel. A depth map may be calculated using a variety of methods. For example, depth mapping of scenery is done by projecting a known light pattern (i.e., a structured light pattern) onto the scenery, and an image capture device captures images of the scenery when the known light pattern is projected onto the scenery. Because the light pattern is fixed and known in advance, sub-portions or unique features of the light pattern may be identified. Distance between portions of the scenery and the image capture device (i.e., "depth" of portions of the scenery) is calculated based on shifts of identified features of the light pattern in images captured by the image capture device. However, capturing images of a light pattern projected onto scenery involves analysing larger amounts of a captured image to identify a feature of the light pattern in the captured image that can be correlated with the features of the known light pattern. Additionally, a relatively large separation between the image capture device and a projector projecting the known light pattern is necessary to provide higher-resolution depth detection by creating a larger shift of the image of the known light pattern with respect to a depth shift of an object in the scenery.

However, these conventional methods of determining a depth map are computationally expensive and do not produce results that allow accurate determination of certain objects. For example, conventional depth mapping methods do not allow accurate detection of fingers or body parts to distinguish between closely related gestures or postures. Additionally, present posture, skeleton model, gesture, recognition methods and systems require prior posture or gesture to be identified by the system's camera. For example the user must present his hand to the camera to provide a "stop" sign posture which is already well defined and recognized by the system. This prior posture detection step restrict the natural behavior of the user and complicates the gesture recognition procedure as it requires the user to perform a predefine posture before each interaction with the gesture recognition system

SUMMARY

An object within a volume is tracked by providing a light beam that is encoded according to one or more predefined properties to encode a predefined optical structure onto the light beam. In one embodiment, the light beam is structured light, such as a plurality of stripes. The encoded light beam is projected into the volume and light reflected from the volume is detected by a detector. Examples of the predefined optical structure encoded onto the light beam include: collimation angle of a light profile, intensity in the light beam profile, uniformity in the light profile, and coherence of the light source. The detected reflected light is analyzed and the object is segmented according to at least one light reflective characteristic of the object. Based on the segmentation, the object may be identified as an object of interest. In some embodiments, a depth map of the segmented object is generated from the detected reflected light.

The object may be segmented according to a reflected width of light in a pattern in the detected reflected light. Alternatively, the object is segmented based on an intensity profile change of the detected reflected light. The intensity profile change may be a change in a local uniform reflected profile of the pattern in the detected reflected light or may be a speckle of the pattern in the detected reflected light. As another example, the intensity profile change is a change in a diffused or stray light profile of the pattern in the detected reflected light.

In an embodiment, the light beam is polarized into a polarization structure and an additional polarization structure, which yields a plurality of images. An image of the polarization structure of the volume is subtracted from an additional image of the additional polarization structure of the volume, and extracting the object from the subtraction of the image of the polarization structure from the additional image of the additional polarization structure. The object may be a part of a user's body (e.g., a hand, an arm), a gaming tool, or any other suitable object.

An additional object within the volume may be identified by comparing a characteristic of reflected light detected from the additional object in the volume to a characteristic of detected light reflected from the object. Based on the comparison, the additional object is segmented. For example, the object is a face of a user and the additional object is a hand of the user.

In various embodiments, an apparatus includes a light source configured to produce a light beam, which may be a light pattern, and an optical element is configured to apply a predefined optical structure configured to vary according to a physical structure of an object to the light beam. The light beam is projected into a volume after application of the predefined optical structure. A detector is configured to obtain a plurality of images of reflection of the light beam projected into the volume, while a processor is coupled to the detector and configured to extract the object from the plurality of images based on at least one change in a profile of light from the reflection of the light beam projected into the volume by the object. For example, the change in the profile of the light from the reflection of the light beam is a change of a light pattern width along the reflection of the light beam or is a change in a Gaussian cross-sectional intensity profile of the reflection of the light beam. In other examples, the change is a change in a local uniformity profile of the reflection of the light beam or is a change in a speckle profile of the reflection of the light beam.

The apparatus may include a polarizer positioned proximate to the detector in some embodiments. The polarizer is configured to polarize the light beam reflected from said volume according to at least two predefined polarization structures. In some embodiments, the processor is configured to extract the object from the images captured by the detector by subtracting an image of a polarization structure of the object from an additional image of an additional polarization structure of the object.

Figure 1A:
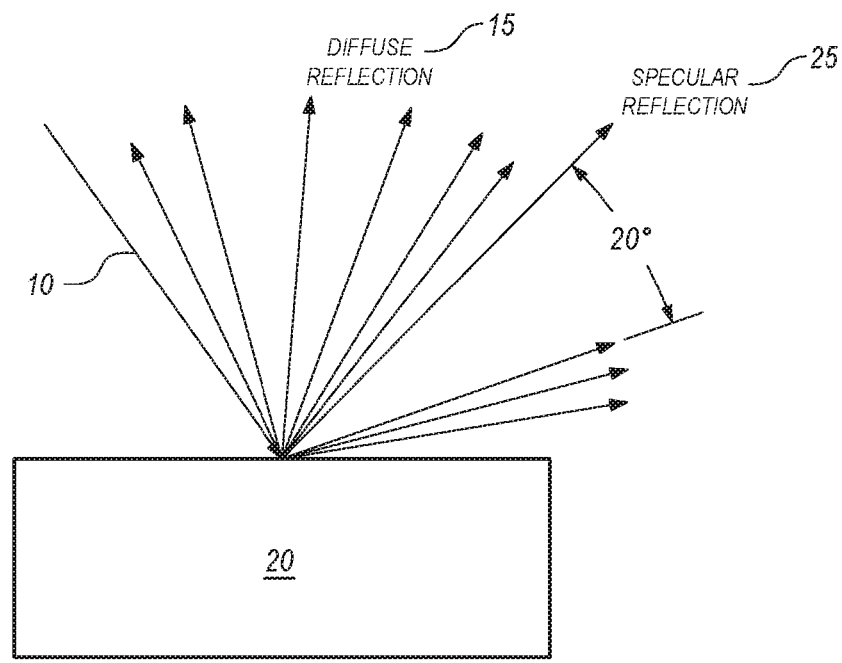
FIGS. 1A and 1B are conceptual diagrams illustrating light reflectance of objects, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

Three-dimensional depth mapping of a volume, such as a scene or scenery, is used in various systems (e.g., skeleton modeling, gesture recognition systems, VR (virtual reality), augmented reality or remote control sensing applications) to extract objects in the volume. For example, depth mapping is used to extract a user's hands or the user's face from the volume. Data from three-dimensional depth mapping allows a user's hand, a user's face, or another object to be segmented from the background scenery in the volume. Conventional methods calculate a three-dimensional depth map of the complete volume to allow segmentation of objects from the volume. However, generating a three-dimensional depth map of the complete volume involves significant computing resources, and often use a designated processing unit. Additionally, extracting a high resolution three-dimensional depth map allowing extraction of certain objects (e.g., fingers) from background scenery may be limited by ambient light conditions, limiting effective extraction of certain objects from a scene to predefined and accurate restriction of the scene.

Other conventional techniques for recognizing gestures by objects in a volume or skeletal modeling provide two-dimensional red, green, blue (RGB) data from which body parts or other objects are extracted. For example, color analysis or image differences from RGB data are used. Additionally, methods using two-dimensional RGB data may also consume significant computational power and are sensitive to light conditions in the volume. Further, using two-dimensional RGB data does not allow extraction of complex postures and three-dimensional data.

Additionally, other conventional gesture recognition systems and methods rely on a predefined posture or shape of a detected object (e.g., a user's hand) to validate the object and extract the object from captured images. However, using predefined postures or shapes to extract an object restricts natural behavior of users and complicates gesture recognition by specifying a posture or gesture for a user before the user interacts with a gesture recognition system. As used herein, "gesture" refers to as a predefined posture or position of an object (e.g., a user's hand, a user's body) or to a predefined movement of the object in two dimensions or in three dimensions.

To detect or model gestures, a transmitter includes a light source (e.g., a laser diode) and one or more optical elements configured to generate a predefined light pattern. The optical elements may be diffractive optics, refractive optics, or other light structuring elements capable of providing a predefined light pattern. The transmitter is configured to illuminate a volume within a field of view of a camera sensor by projecting the light pattern into the volume. The projected light pattern may be encoded with or defined by various light properties of the volume. Example light properties include: collimation angle, intensity variations, polarization, and one or more coherence characteristics of the light. As used herein, "encoded" is defined as manipulating a projected pattern to include one or more properties such intensity variations, polarization and one or more coherence characteristics of the light. Properties of the projected light pattern are affected by the surface of the objects (e.g., a body) in the volume, and light reflected from an object is analyzed detect and/or segment the object from the background (e.g., other objects in the volume). Examples properties of an object's surface affecting properties of the projected light pattern include: the object's surface roughness (e.g. scattering), the object's transparency, the object's diffusion properties, the object's absorbance, and the object's specularity.

In some embodiments, the projected light pattern has specific predefined or known properties according to various depths or fields of vision. For example, such as a user's hand, includes a specific set of surface properties. Examples properties of the user's hand include roughness (e.g. scattering), transparency, diffusion properties, absorbance, and specularity. Because of the properties of the user's hand, the light pattern reflected by the user's hand has a specific and unique signature that differs from signatures of the light pattern reflected by other objects in the volume. Based on the signature of the light pattern reflected by the user's hand, additional objects having the same, or similar, surface properties as the user's hand (e.g., other areas of skin matching skin on the user's hand) may also be segmented from other objects in the volume. Segmenting an object from the volume based on the light pattern reflected by the object allows the object to be locally segmented and to be segmented in a volume having complex scenery where the complete light pattern or the complete scenery cannot be analyzed.

Additionally, using reflected light patterns allows one or more objects to be segmented from a volume including a scene (e.g., various objects) without prior information about the objects (e.g., structure, shape). Hence, segmenting objects based on reflected light patterns allows an object to be segmented from a volume without stored information identifying shapes or postures of objects, allowing direct and immediate identification of objects from the volume. For example, object segmentation methods using predefined shapes or postures are unable to identify a "stop'" sign or a "swipe" gesture by a user's hand in a volume, if the "stop" sign or the "swipe" gesture was not included in stored information identifying shapes or postures. However, using light patterns reflected from the user's hand allows the user's hand to be identified in a volume without stored information. Identifying objects based on light patterns reflected from the objects reduces computational resources for expanding postures and gestures for interacting with systems.

Reflectance of Objects

Light projected into a volume is reflected differently from various objects in the volume. An object's surface and one or more materials comprising the object affect how the object reflects light. However, various properties of an object affect reflection of light by the object. Example properties of an object affecting how the object reflects light include: texture, type of material, opaqueness, roughness diffuseness, and specularity.

Diffuse reflection is reflection of light from a surface so an incident ray of light is reflected at many angles by the surface. When illuminated, an ideal diffuse reflecting surface has equal luminance from all directions in a half-space adjacent to the surface (Lambertian reflectance). In contrast, specular reflection of light from a surface is reflection of light from the surface so an incident ray of light is reflected at a single angle.

For example, FIG. 1A shows light 10 projected to an object 20 (e.g., a wall) including a glossy surface. The light 10 is reflected by the object 20 as diffuse rays 15 and a specular ray 25. The diffuse rays 15 and the specular ray 25 vary according to Lambert's cosine law for an ideal diffuse reflector.

Figure 1B:
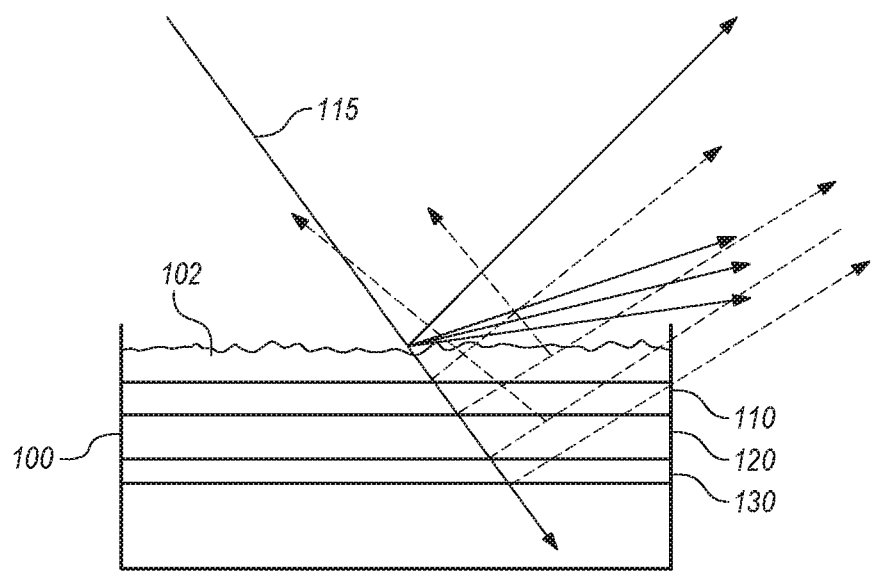

Light reflected by materials or objects which are not fully opaque (e.g., human skin most) contributed by scattering centers beneath a surface of the object. For example, FIG. 1B shows human skin having including a skin surface 102 and sections 110, 120, and 130 of the skin. A light ray 115 incident to the skin is partially reflected by the skin surface 102, while a portion of the light ray 115 passes through the skin surface 102 and is partially reflected by the section 110. Another portion of the light ray 115 passes through the section 110 and into section 120, which reflects a portion of the light ray 115. Similarly, a portion of the light ray 115 passes through section 120 into section 130, which also reflects a portion of the light ray 115. Accordingly, the a series of "primary" scattered rays are generated by the light ray 115 incident on the skin, and the primary scattered rays generated a number of "secondary" scattered rays (shown in FIG. 1B as dotted lines) through the above-described mechanism. The secondary scattered rays similarly generate tertiary scattered rays, etc. The various rays travel through the skin, which partially absorbs light from the various rays, with portions of the various rays reaching the skin surface 102, where they exit in random directions. Hence, the light reflected by the skin is reflected in multiple directions (e.g., all directions) in a unique structure based on the skin surface 102.

The Kubelka-Munk theory of reflectance provides a physical model for interpreting reflectance of an object. Using the Kubelka-Munk theory, a correlation between reflectance and concentrations of absorbing species in weak absorbing samples is given. The Kubelka-Munk functions is given by:

$$F(R)=(1-R)^2/2R=k/s=Ac/s$$

where:
R=reflectance,
k=absorption coefficient,
s=scattering coefficient;
c=concentration of the absorbing species; and
A=absorbance.

Therefore, a light pattern projected into a volume including an object, such as human skin, is reflected differently from the object and the background of the volume.

Gesture and Posture Detection

Figure 2:
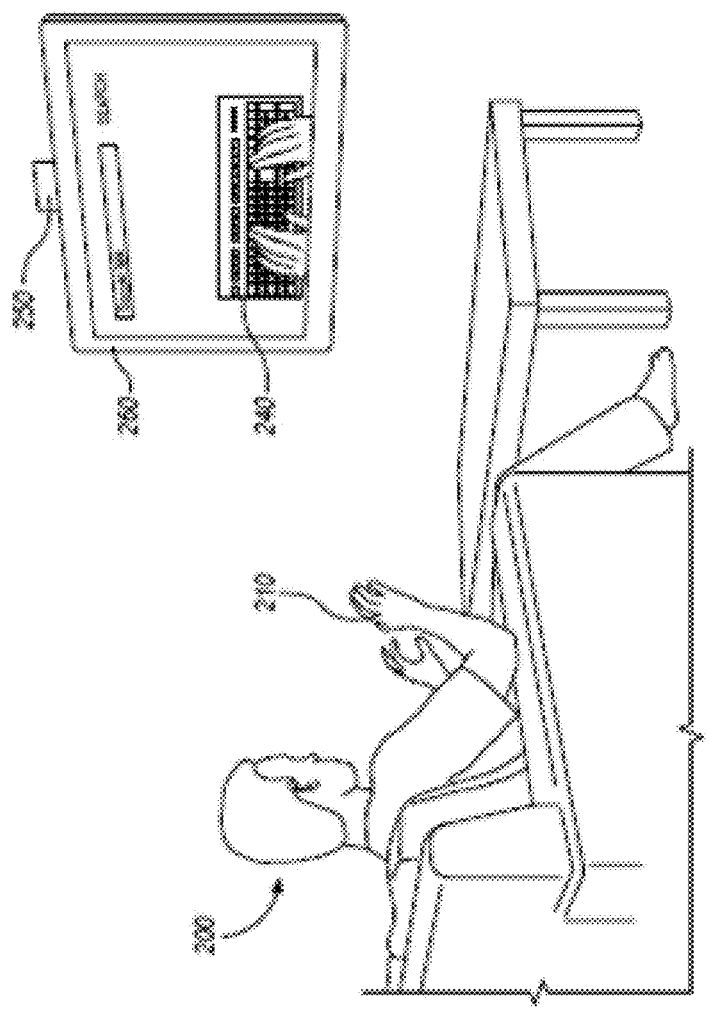
FIG. 2 is a conceptual diagram of a user interacting with a device using gestures, in accordance with an embodiment.

FIG. 2 is a conceptual diagram of a user 200 interacting with a device using gestures, such as movements of the user's hands 210 in the air. In the example of FIG. 2, movement of the user's hands 210 allows the user 200 to type on a virtual keyboard 240 displayed on a screen 260. To detect the gestures, a detection device 250 shines a light pattern onto the hands 210 and detects reflection of the light pattern from the hands 210. Triangulation based on the reflected light pattern allows the detection device 250 to generate a depth map of a volume including the hands 210.

Figure 3:
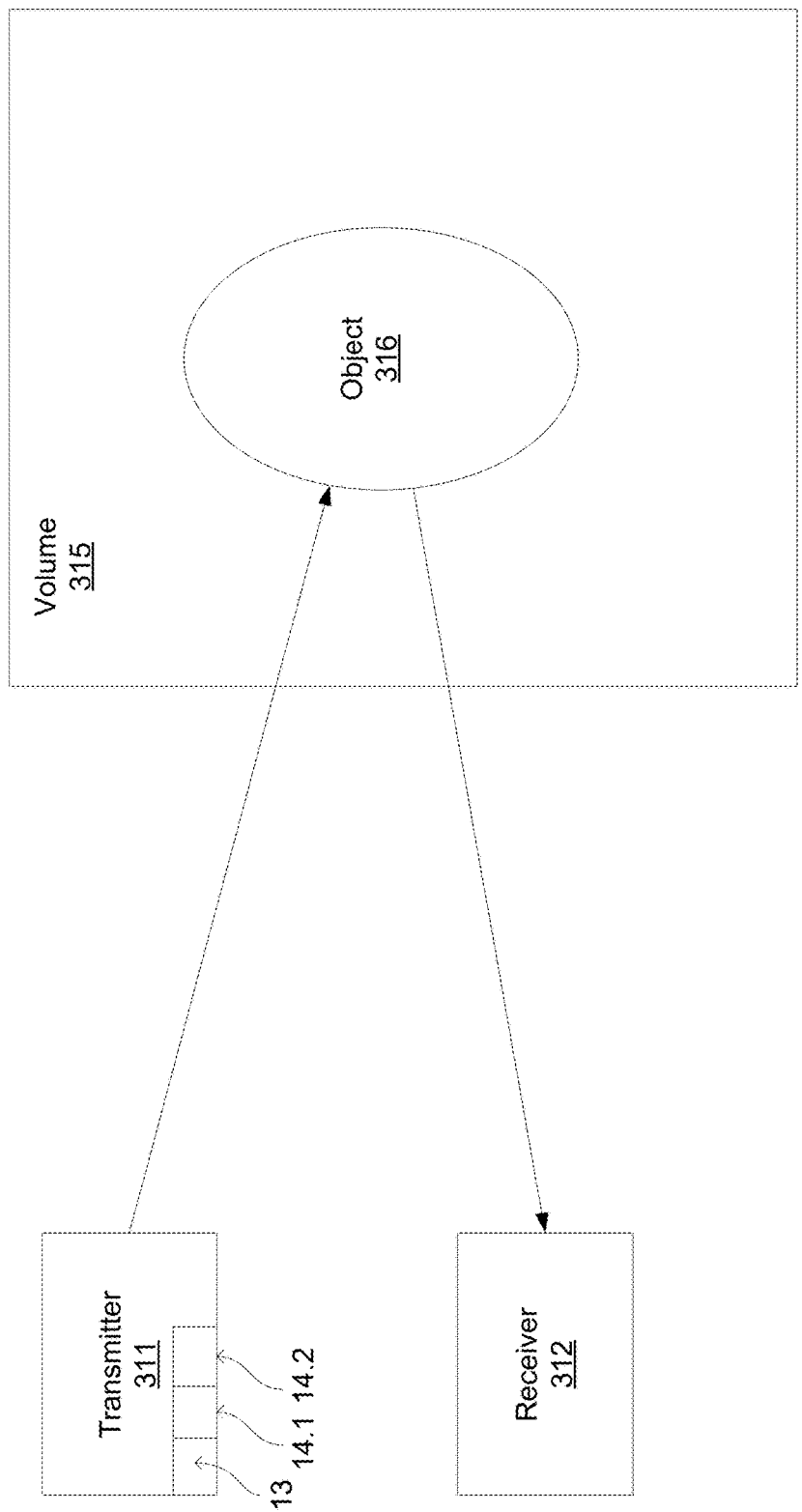
FIG. 3 is a block diagram of a system for segmenting an object, in accordance with an embodiment.

FIG. 3 is a block diagram of one embodiment of a system for segmenting an object. In the example of FIG. 3, the system includes a transmitter 311 and a receiver 312. In various embodiments, the transmitter 311 includes a light source 313 (e.g., a laser light source) followed by one or more optical elements 314.1, 314.2, which encode a pattern onto light from the light source 313. The transmitter 311 emits the light onto which the light pattern is encoded into a volume 315 (e.g., a scene). As objects (e.g., object 316) in the volume 315 reflect the light pattern, the reflected light pattern acquired various characteristics. Example characteristics of the reflected light pattern include: collimation angle, intensity variations, polarization, and one or more coherence characteristics. The receiver 312 (e.g., a camera having a charge coupled display detector, a complementary metal oxide semiconductor detector) captures reflected light from objects in the volume 315 and analyzes the reflected light pattern. Using signatures of the light pattern reflected from objects in the volume 315, the receiver 312 determines whether an object in the volume 315 is an object of interest.

For example, the receiver 312 performs a segmentation process on the reflected light pattern to determine whether an object in the volume 315 is an object of interest. Any suitable object in the volume 315 may be an object in interest in various embodiments. For example, a tennis racquet is an object of interest or a portion of a user's body (e.g., a hand, an arm) is an object of interest. In some embodiments, the receiver 312 also obtains depth information for various points in the volume 315 that reflect the light pattern.

Figure 4:
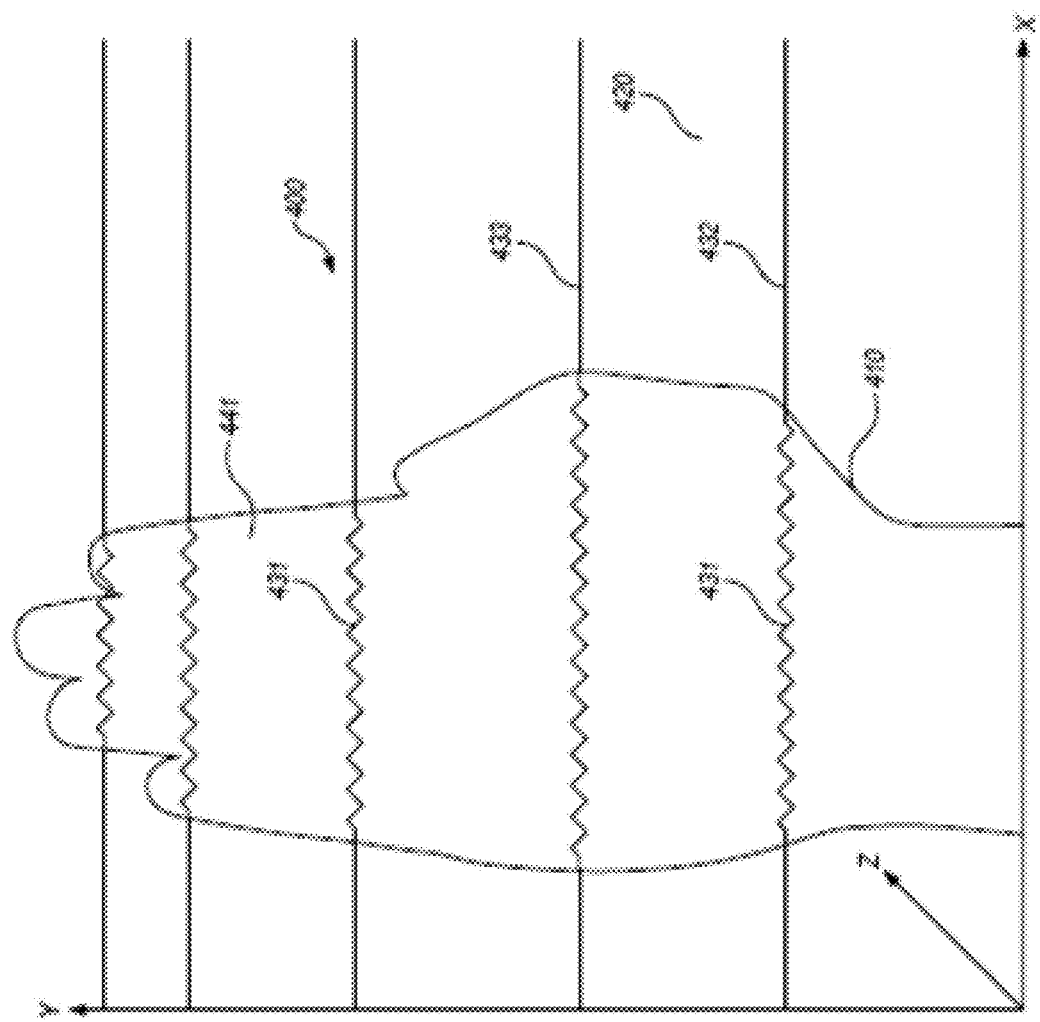
FIG. 4 is a conceptual diagram of a light pattern projected onto a user's hand, in accordance with an embodiment.

FIG. 4 is a conceptual diagram of a light pattern projected onto a user's hand 410. As further described below, based on characteristics of the light pattern reflected by the user's hand 410, the hand 410 may be detected or movement of the hand 410 is tracked without prior information about the hand 410. To allow detection or tracking of the hand, the light pattern projected onto the hand 410 is encoded to allow tracking. In various embodiments, the light pattern projected onto the hand 410 allows tracking of movement in bi-dimensional video data, which increases complexity of differentiating the hand 410 from other portions of a user's body according to distance. According to one embodiment, the light pattern is specifically designed to track movement of the hand's 410 digits in bi-dimensional video data (e.g., video images from a conventional video camera). More specifically, the light pattern is designed to enable detection and tracking of digits (i.e., fingers and thumb) of the hand 410 as well as a palm of the hand 410 from the bi-dimensional video data according to a detected predefined signature of the light pattern reflected by the object, such as distortions or size of the light pattern reflected by the object, as further described below. In the example shown in FIG. 4, the light pattern includes multiple stripes parallel to, or nearly parallel to, each other.

A camera (e.g., receiver 312 in FIG. 3) is positioned with a projector (e.g., transmitter 311) that projects the light pattern (e.g., the stripes in FIG. 4) onto the hand 410 and onto a background 420, such as a surface on which the hand 410 rests, of a volume including the hand 410. The camera and the transmitter may be positioned parallel to one another in a common axis, may be positioned orthogonal to each other, or may be positioned in any other position relative to each other in various embodiments. The position of the camera may be selected as to create a triangulation effect between the camera, the light projector, and light from the light projector reflected from the hand 410 and the background 420 to the camera.

Objects, such as the hand 420, in the volume are identified or segmented according to unique light characteristics reflected from surfaces of various objects (e.g., skin of the hand 420). Hence, light from the light pattern scatted by the hand's 420 skin changes one or more characteristics of the light pattern at points along a strip of the pattern projected onto the hand 420. Based on the change in the one or more characteristics of the light pattern from scattering by the hand 420, a processor or other device identifies the hand 420.

An identified change in a characteristic of a segment of the reflected light pattern segments (e.g., divides) the volume into two or more sections or zones. In the example of FIG. 4, a change in a segment of the light pattern reflected by the hand 420 divides the volume into a "skin" zone that includes the hand 420 and a "background" zone including objects or material other than the hand 420. For example, zone 431 in FIG. 4 includes the hand 420 and includes a portion of the reflected light pattern having one or more specific characteristics identifying a portion of the light pattern reflected by skin, while zone 432 in FIG. 4 includes portions of the light pattern reflected by objects having surfaces other than skin (e.g., objects in the background of the volume).

For example, the transmitter 311 in FIG. 3 includes multiple optical elements, such as a DOE (Diffractive Optical Element) or a ROE (Refractive Optical Element), so light emitted by the transmitter 311 is encoded with different properties (e.g., intensity coherence level, collimation angles). Properties of the emitted light forms noise in or around stripes of emitted light emitted onto the hand (i.e., emitted light in zone 431). Accordingly, diffusion of light from the light pattern reflected from the skin of the user's hand results in stripes of the emitted light pattern in zone 431 to appear clean, clear and smooth, while stripes reflected from objects having surfaces other than skin to appear ripped and shredded.

Based on one or more characteristics of light in the light pattern (e.g., stripes) reflected by the hand 420, the hand 420 is may be identified and segmented from other objects in the volume. Example characteristics of the reflected light pattern include: reflected pattern light width, intensity profile change (e.g. expansion) of the reflected light (e.g., a change in a Gaussian cross-sectional intensity profile of the light pattern), local uniformity (a change in the profile of the reflected pattern relative to the projected light pattern such as smoothness in the pattern intensity of a portion of the reflected light pattern), changes in polarization of the reflected light pattern, speckle in the reflected light pattern due to surface opaqueness, roughness and the coherences level, diffused or light, and change in contrast of portions of the light pattern and background between portions of the light pattern (e.g., when the light pattern is emitted onto a semi-transparent media, such as a human skin, where light travels into the media). While FIG. 4 shows an example light pattern comprising multiple stripes (e.g., a linear pattern), other types of light patterns may be used in other embodiments. Examples of alternative light patterns include: dots, triangles, rectangles, and circles. In various embodiments, the light pattern is larger than a single pixel (e.g., the light pattern encompasses multiple pixels).

Figure 5:
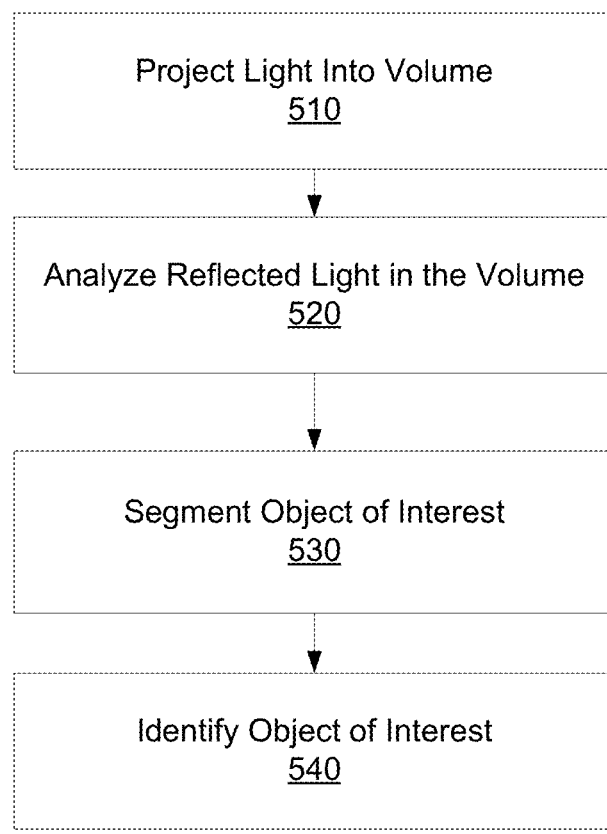
FIG. 5 is a flowchart of a method for segmenting an object in a volume, in accordance with an embodiment.

FIG. 5 is a flowchart of one embodiment of a method for segmenting an object in a volume. In other embodiments, the method includes different or additional steps than those described in conjunction with FIG. 5. Additionally, in various embodiments, steps of the method may be performed in different orders than the order described in conjunction with FIG. 5.

Light is projected 510 into the volume, as further described below. In various embodiments, the projected light comprises a light pattern, such as super speckle stripes. As the light is projected 510 into the volume, stripes from the light pattern fall onto an object of interest. As further described above in conjunction with FIG. 4, a pattern of the object of interest is indicated by noise or one or more other characteristics (e.g., pattern width, shape, and incoherence) of a portion of the light pattern (e.g., stripes) reflected by the object of interest. The light pattern reflected (i.e., the "reflected light pattern") by the object of interest (and reflected by other objects) is analyzed 520 by a computer processor. For example, pixels of an image of the light pattern reflected by a volume including the object of interest is analyzed by a detection algorithm based on one or more reflected light pattern characteristics in each pixel. Based on the analysis of the reflected light pattern, the object of interest is segmented 530 from the volume, allowing for rapid and direct finding of objects in the volume and rapid identification of objects of interest (e.g., hands, fingers) in the volume. For example, an image of light reflected by the volume is scanned and each pixel in the image is identified as "background" or as an "object" (e.g., a hand). In some embodiments, after segmenting 530 the object of interest from the volume, the object of interest is identified 540. Unlike conventional methods where an object is identified from a volume based on the object's shape and stored information describing the object (e.g., having a user raise the user's hand and open the user's hand in a particular pattern to identify the user's hand), the above-described method allows the object of interest to be accurately and directly identified regardless of an initial shape of the object. In some embodiments, after segmenting 430 or identifying 540 the object of interest, depth information for various points of the object of interest is determined.

Figure 6:
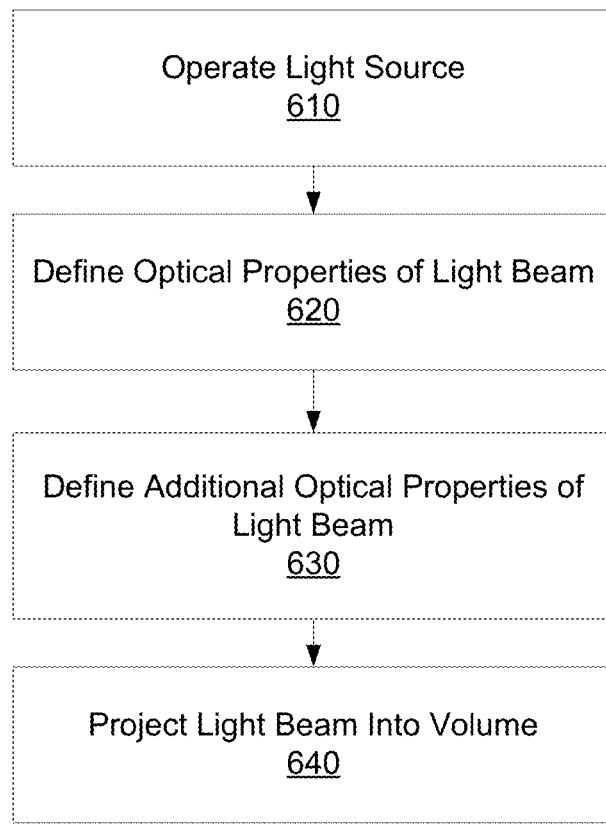
FIG. 6 is a flowchart of a method for operating a light beam, in accordance with an embodiment.

FIG. 6 is a flowchart of one embodiment of a method for operating a light beam. In other embodiments, the method includes different or additional steps than those described in conjunction with FIG. 6. Additionally, in various embodiments, steps of the method may be performed in different orders than the order described in conjunction with FIG. 6.

A light source is operated 610 to provide a light beam. In various embodiments, the light source is an array of semiconductor lasers. For example, the light source is a vertical-cavity surface-emitting laser (VCSEL) array. Lasers in the array may be operated individually or in rows, allowing a variation in the light beam to be provided by varying intensities of the lasers in different rows to provide a cyclic variation in intensities between rows.

Optical properties of the light beam are subsequently defined 620, allowing detection of different properties of reflected light when the light source is reflected from objects in a volume (e.g., a hand in the volume, a wall in the volume). In some embodiments, additional optical properties of the light beam are also defined 630. After defining 620 the optical characteristics (as well as the additional optical characteristics in some embodiments), the light beam having the optical properties is projected 640 into the volume.

Comparison Reflectance Methods

Differences between reflectance of light from different objects based on various conditions increases complexity of identifying an on object from a signature of light reflected by the object. For example, light reflected by skin changes as the skin ages, resulting in different reflectance of light by younger skin than by older skin. Accordingly, some embodiments identify an object from a volume by comparing one or more characteristics of light reflected by an object in the volume to one or more characteristics of an additional object in the volume. Such a comparison may provide information about light reflected from the object without prior information describing reflectance of light by the object.

Figure 7:
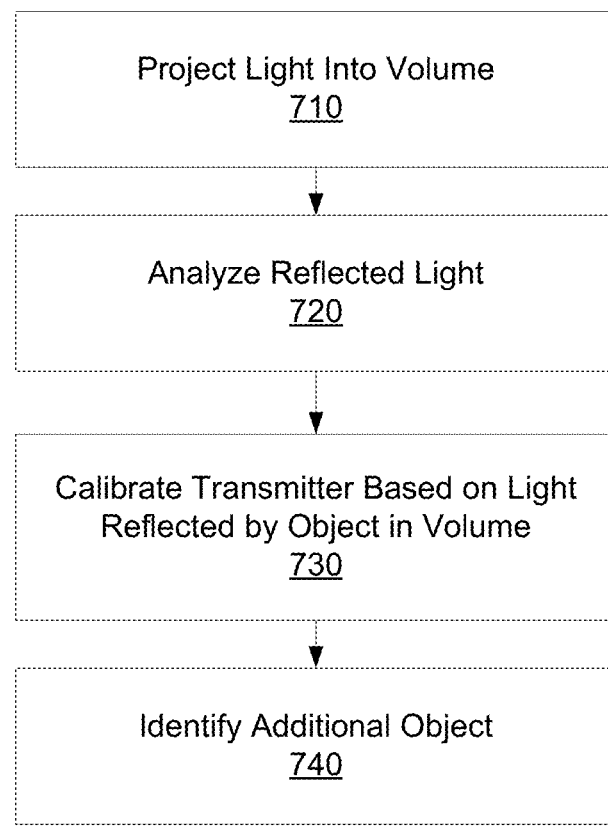
FIG. 7 is a flowchart of a method for identifying an object from a light beam projected into a volume, in accordance with an embodiment.

FIG. 7 shows a flowchart of one embodiment of a method for identifying an object from a light beam projected into a volume. In other embodiments, the method may include different or additional steps than those described in conjunction with FIG. 7. Additionally, in various embodiments, steps of the method may be performed in different orders than the order described in conjunction with FIG. 7.

A transmitter projects 710 light into a volume including multiple objects, such as an object and an additional object. A detector captures light reflected from the object and the additional light and analyzes 720 the reflected light to identify one or more characteristics of light reflected by the object. Based on a signature of light reflected by the object, the transmitter is calibrated 730 to identify other objects in the volume reflecting light with the same signature as the light reflected by the object. In the example of FIG. 7, light reflected by the additional object has a signature matching light reflected by the objects, so the additional object is also identified 740 based on the signature of light reflected by the additional object. For example, the object is a user's face identified according to shape recognition methods or image processing methods; alternatively, the user's face is identified based on characteristics of light reflected by the user's face, as further described herein. After identifying the user's face, the transmitter is calibrated 730 to identify objects in the volume that reflect light having common characteristics to characteristics of light reflected by the user's face. Such calibration allows identification of other objects having a surface of skin in the volume, such as the user's hands or arms.

Figure 8A:
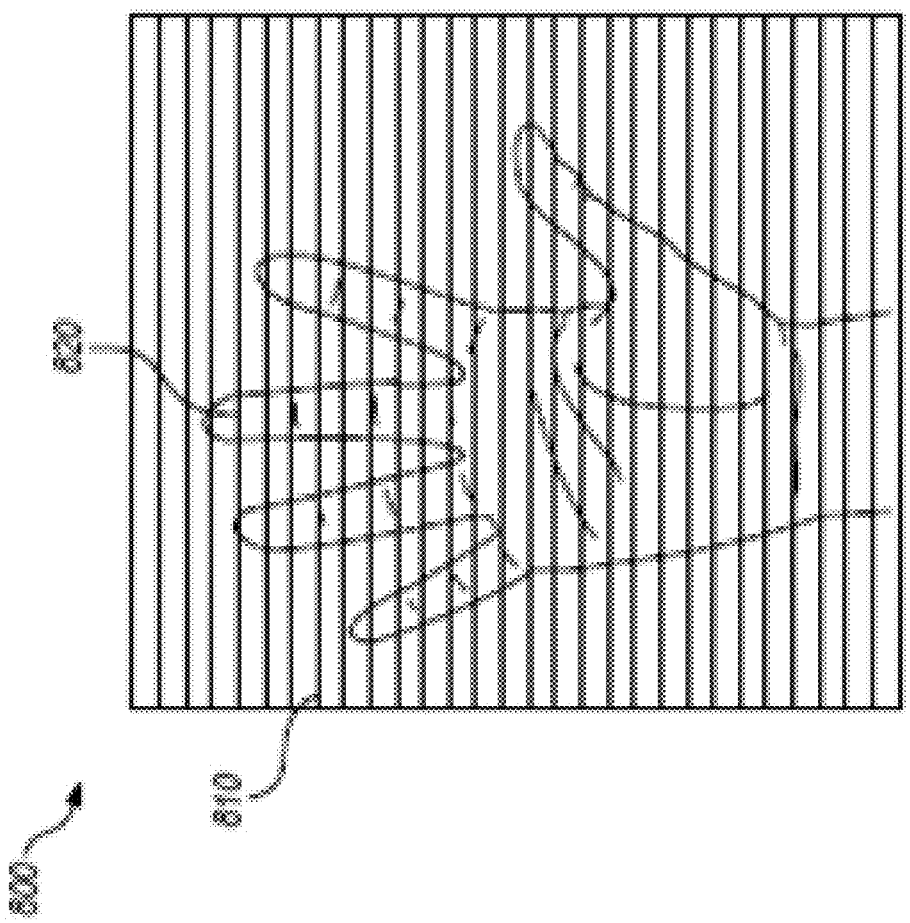
FIGS. 8A-8C are examples of projecting a light beam onto an object in a volume, in accordance with an embodiment.
Figure 8B:
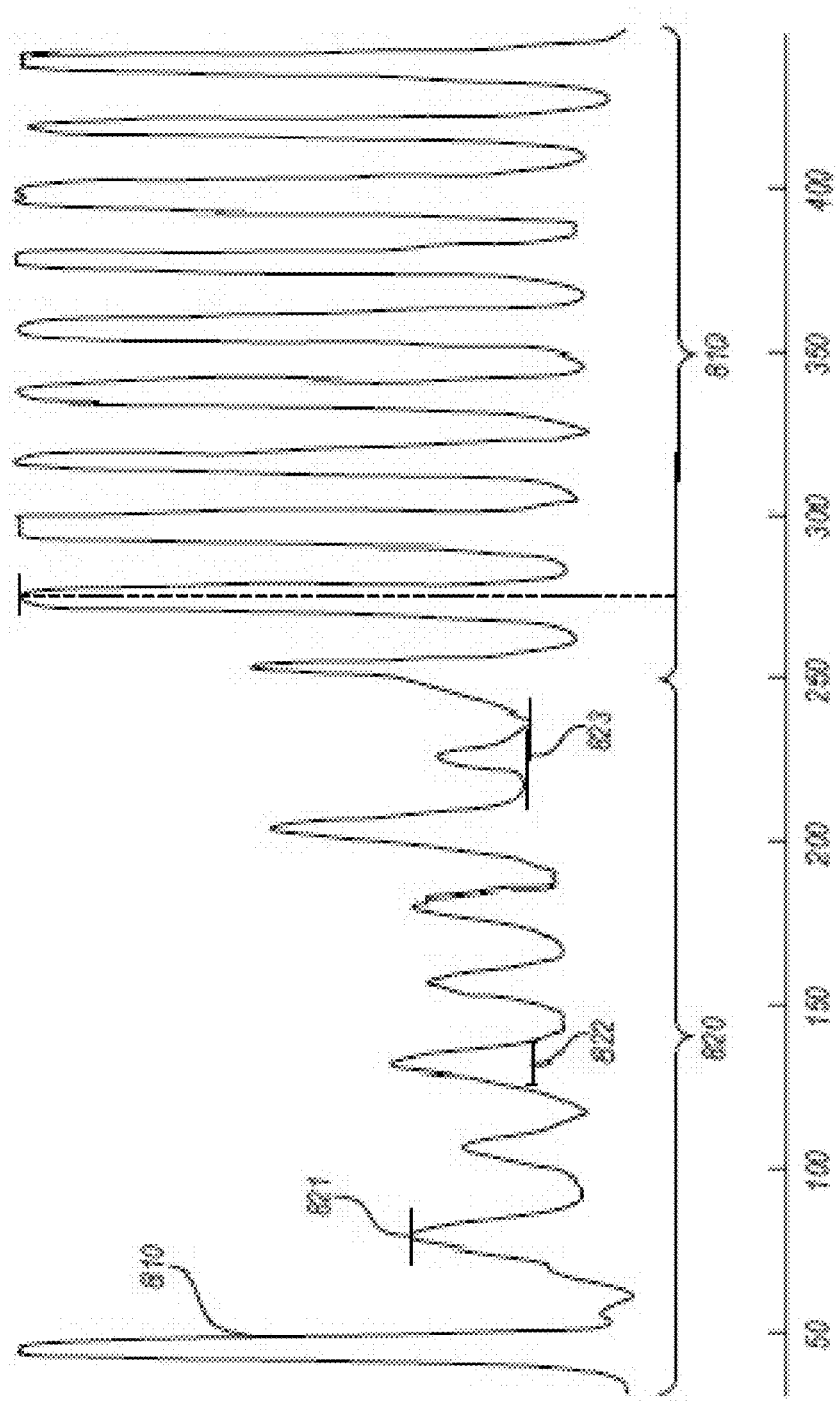
Figure 8C:
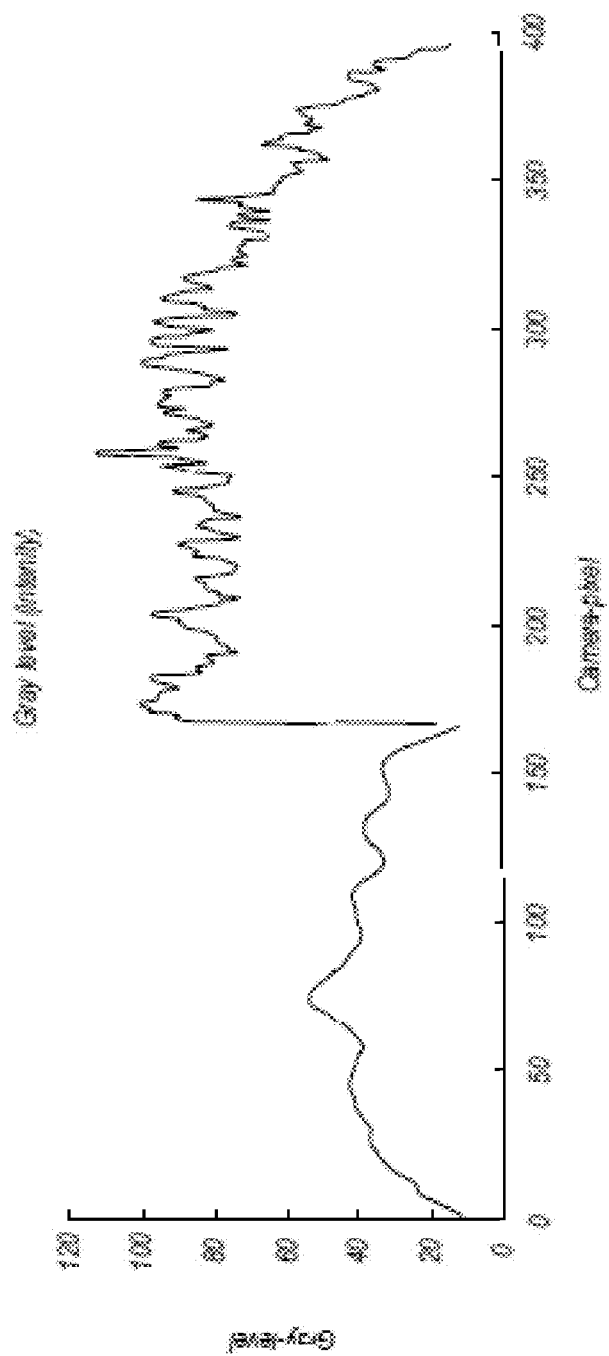

FIG. 8A is an example image 800 of multiple stripes from a light pattern reflected by a hand 820 and a by a background 810. In the example of FIG. 8A, the hand 820 may be extracted from the background 820 based on variations of one or more characteristics of the light pattern reflected by the hand 810 and by the background 820. Example characteristics of the light pattern reflected by the hand 810 or by the background 820 include: intensity variation of stripes in the light pattern, width variation of stripes in the light pattern, speckle uniformity, local uniformity, and diffused stray light in a stripe profile along an axis. For example, FIG. 8B shows changes in gray level of a stripe profile along an axis of the stripe (e.g., intensity vs. pixel) reflected by the background 810 and reflected by the hand 820. In the example of FIG. 8B, the curve representing the hand 820 shows changes in intensity 821, changes in stripe width 822, and changes in stray light 823 relative to the curve representing the background 810. FIG. 8C illustrates the change between reflectance of light by the hand 820 on the left side of FIG. 8C and reflectance of light by the background 810 on the right side of FIG. 8C.

Polarization

Polarization imaging is a manifestation of depolarization caused by scattering of light from an object (e.g., skin). Polarization systems and methods are widely used in medical fields (e.g., skin cancer detection). A depolarization reflectance from an object includes backscattered light reflected from the object's surface, while a superficial layer of the object retains linear polarization of light illuminating the object, backscattered light from a deeper layer of the object is depolarized. Directing an output polarizer parallel to or perpendicular with an input polarizer allows selection of a depth of the backscattered signal.

Polarization speckle pattern is represented by the following equation:

$$D(x,y)=(I_\|(x,y)-I_\perp(x,y))/(I_\|(x,y)+I_\perp(x,y))$$

where: $I_\|(x,y)$ and $I_\perp(x,y)$ are the pixel intensities of the corresponding parallel and perpendicular polarizations.

Figure 9A:
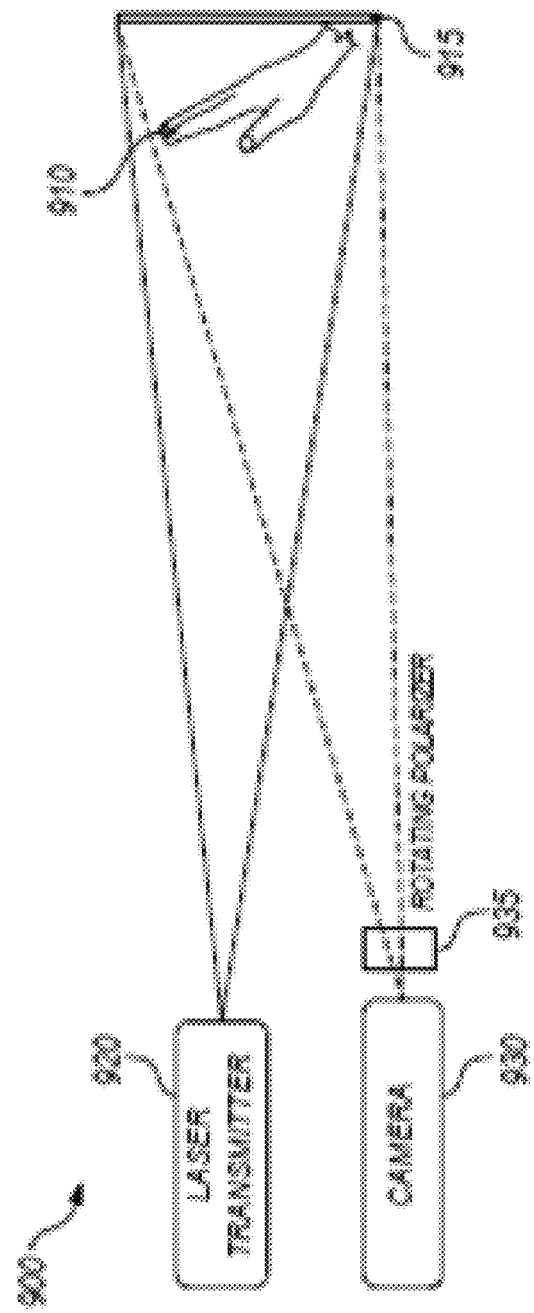
FIGS. 9A-9C are example configurations of a system for segmenting an object in a volume by projecting a light beam into the volume, in accordance with an embodiment.

Hence, in some embodiments, an object in a volume is identified by extracting, or segmenting, the object from other objects in the volume based on a depolarization backscattered light reflectance from the object. FIG. 9A is a block diagram of one embodiment of a system 900 for extracting an object, such as a user's hand 910, from a volume and identifying the object. In the example shown by FIG. 9A, the system 900 includes a transmitter 920, such as a laser transmitter, which projects light into the volume. A polarizer 935 (e.g., a linear polarizer) is positioned in proximity to a camera 930, such as a charge coupled device camera. The camera 930 captures images of light from the transmitter 910 projected into the volume, and the polarizer 935 is in a field of view of the camera 930 (e.g., between the camera 930 and the volume). In some embodiments, the polarizer 935 is coupled to a rotator configured to rotate the polarizer by 90 degrees between successive frames captured by the camera 930.

Hence, the camera 930 captures two images (e.g., successive frames) that are orthogonal polarizations of images of the scene. A polarization speckle pattern of each image is calculated and analyzed according to the above-identified polarization equation. Using a filtering algorithm, the object is extracted from the background.

Figure 9B:
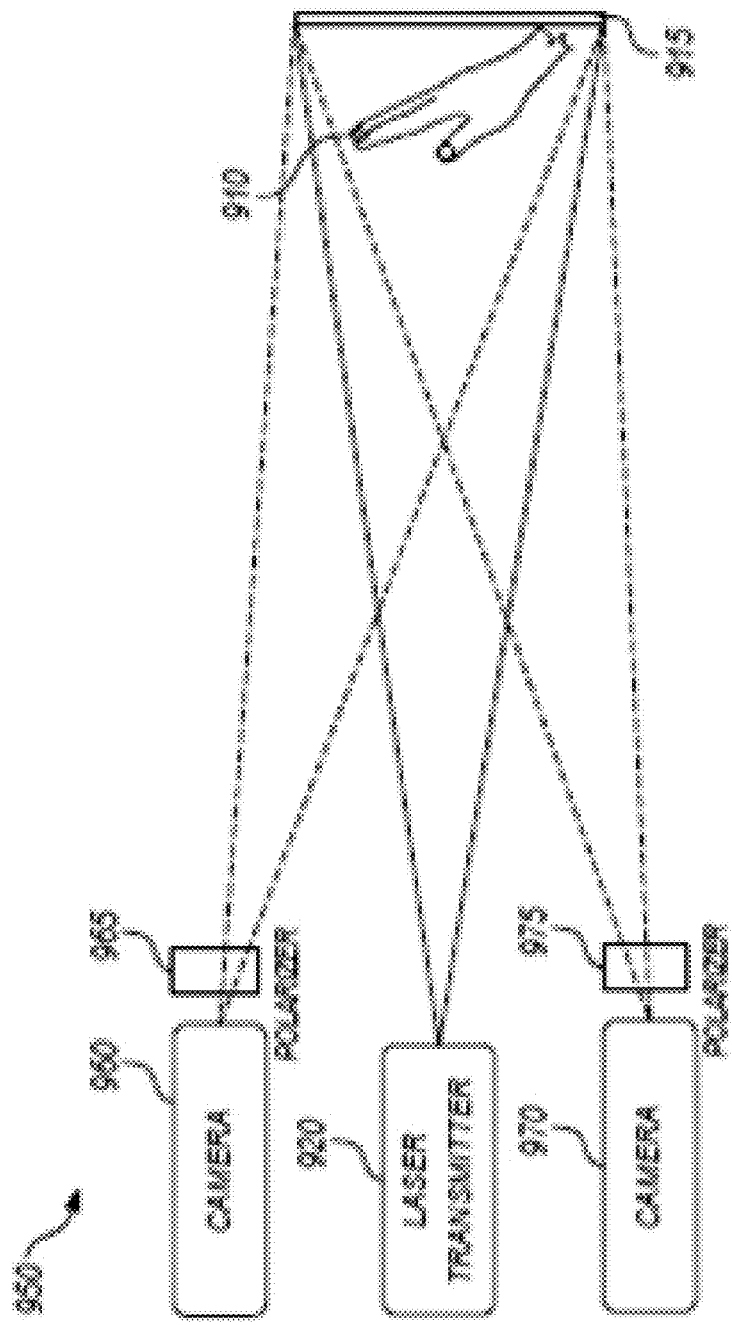

FIG. 9B shows a block diagram of an alternative embodiment of a system 950 for identifying an object, such as a user's hand 910, from a volume. The system 950 shown in FIG. 9B includes a transmitter 920, such as described above in conjunction with FIG. 9A, configured to project light into the volume. Additionally, the system 950 includes a camera 960 and an additional 970 camera, which may be charged coupled device cameras. A polarizer 965 is positioned proximate to the camera 960 and between the camera 960 and the volume, while an additional polarizer 975 is positioned proximate to the additional camera 970 and between the additional camera 970 and the volume. The polarizer 965 causes the camera 960 to image the volume using a polarization orientation, while the additional polarizer 975 causes the camera 970 to image the volume using an additional polarization orientation. For example, the polarization orientation is +45 degrees with respect to a horizontal axis of the polarizer 965, while the additional polarization orientation is −45 degrees with respect to a horizontal axis of the additional polarizer 975.

Figure 9C:
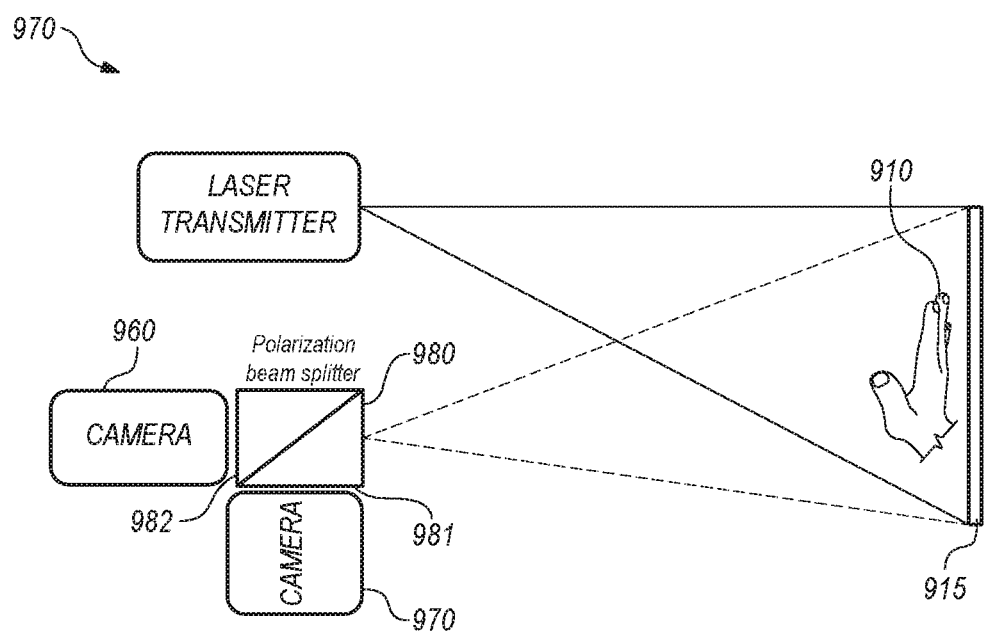

FIG. 9C is a block diagram of another embodiment of a system 970 for identifying an object, such as a user's hand 910, from a volume. In the embodiment shown in FIG. 9C, a polarization beam splitter 980 is positioned between the camera 960 and the volume (e.g., in a field of view of the camera 960) and between the additional camera 970 and the volume (e.g., in a field of view of the additional camera 970). The polarization beam splitter 980 polarizes light reflected from the volume and directs a portion of the light reflected from the scene to the camera 960 and directs another portion of the light reflected from the scene to the additional 970. The camera 960 and the additional camera 970 may be orthogonal to one another and attached to, or proximate to different sides 981, 982, respectively, of the polarization beam splitter 980.

Figure 10:
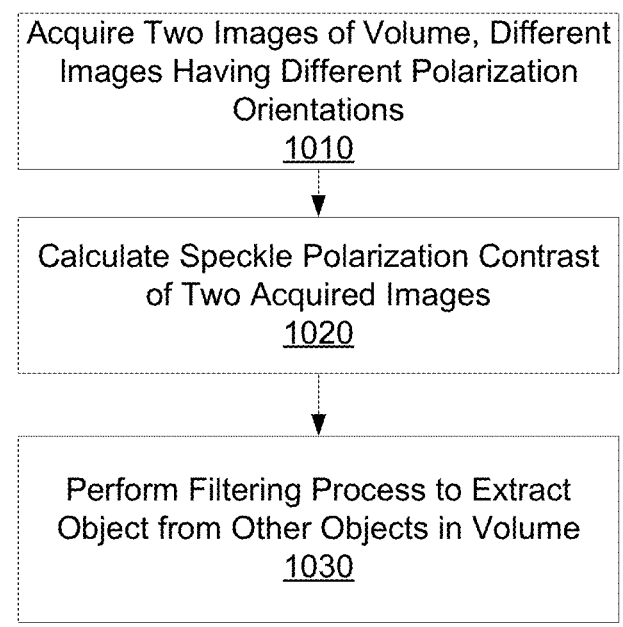
FIG. 10 is a flowchart of a method for segmenting an object in a volume, in accordance with an embodiment.

FIG. 10 is a flowchart of one embodiment of a method for extracting an object in a volume. In other embodiments, the method may include different or additional steps than those described in conjunction with FIG. 10. Additionally, in various embodiments, steps of the method may be performed in different orders than the order described in conjunction with FIGS. 10.

At least two images of the volume are acquired 1010, with different images having different polarization orientations. For example, an image has a polarization orientation, while an additional image has an alternative polarization orientation differing from the polarization orientation. In the example shown by FIG. 11, a polarization image 1110 of the volume including a user's hand is polarized at an orientation of +45 degrees, while another image 1120 of the volume including the user's hand is polarized at an orientation of −45 degrees.

From the acquired images, a pluralization contrast, such as a speckle polarization contrast of two of the acquired images polarized images is calculated 1020 according to the following equation:

$$C=(A-B)/(A+B)$$

where: $A$=image with +45 polarization orientation, and $B$=image with −45 polarization orientation.

Figure 11:
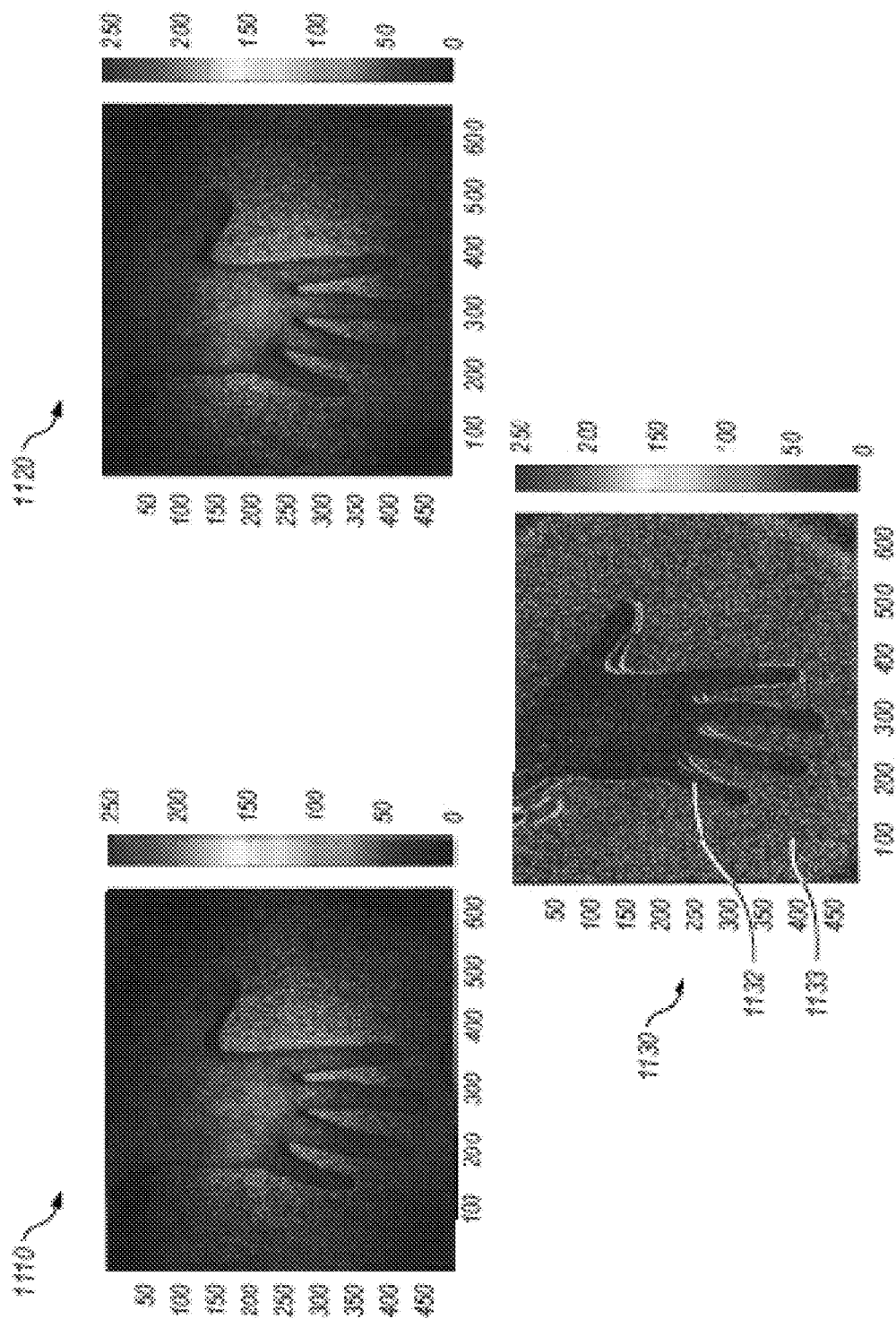
FIG. 11 shows examples of polarization images captured of a beam of light projected onto a hand, in accordance with an embodiment.

A filtering process is performed 1030 to extract the object from other objects in the volume. For example, referring to FIG. 11, image 1130 illustrates performance of a filtering process that calculates a standard deviation of pixels within a threshold distance of each other (e.g., a standard deviation of a 9×9 grid) and removes pixels above a specified threshold. In the example of FIG. 11, image 1130 shows the hand 1132 glaring relative to the background 1133, allowing extraction and identification of the hand 1132 as an object of interest.

Figure 12:
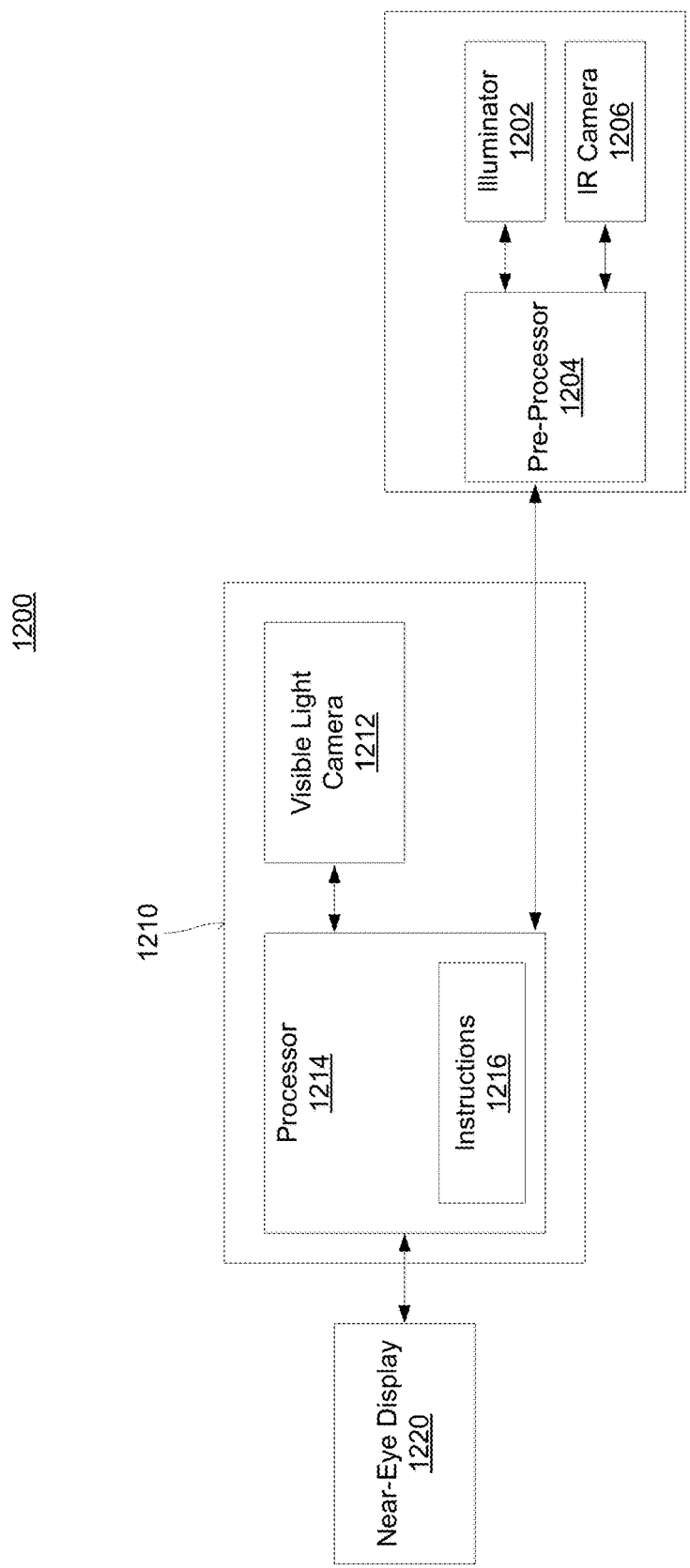
FIG. 12 is a block diagram of a system for segmenting an object in a volume using a light beam, in accordance with an embodiment.

FIG. 12 is block diagram of one embodiment of a system 1200 for segmenting an object in a volume using a light beam. In the embodiment shown by FIG. 12, the system 1200 includes an infrared (IR) illuminator 1202 configured to illuminate the volume with a light pattern, as further described above. A camera, such as an IR camera 1206 is configured to receive reflections of the patterned light from the volume, while a pre-processor 1204 is configured to perform initial processing of data from the IR camera 306.

The system 1200 also includes a computing device 1210, such as a smartphone, including a processor 1214 that executes instructions 1216 stored by or received by the computing device 1210. The computing device 1210 is coupled to a near eye display 1220 configured to present a user with content, such as a synthetic scene or images of portions of a user's body (e.g., hands). In other embodiments, the computing device 1210 may be a laptop, computer, a tablet computer, or any other suitable computing device.

The IR camera 1206 captures reflections of an IR pattern projected into a volume by the IR illuminator 1202. The pre-processor 1204 initially processes the captured reflections and communicates the processed reflections of the IR pattern to the processor 1214 of the computing device 1210. Executing instructions 1216 causes the processor 1214 to segment objects (e.g., body parts of a user) from the received reflections of the IR pattern or to generate a depth map identifying depths of different objects in the volume from the received reflections of the IR pattern.

In some embodiments, the computing device 1210 includes a visible light camera 312 configured to capture two-dimensional color images of objects in the volume (e.g., body parts of the user) illuminated by the light pattern. Thus, the processor 1214 may use a depth map generated from the reflections of the IR pattern and two-dimensional color images of objects in the volume to generate three-dimensional color images of objects identified in the volume (e.g., body parts of the user). The processor 1214 is configured to process a received image of the volume and segment objects from the volume using features of the reflected light pattern and determined reflectance signatures of objects (e.g., body parts of the user). Additionally, the processor 1210 may be configured to superimpose a generated three-dimensional color image of identified objects onto a synthetic scene presented by the near-eye display 1220, allowing a user to view the synthetic scene and the objects (e.g., body parts of the user) identified from the volume positioned and oriented in the synthetic scene as they are in real life.

Figure 13:
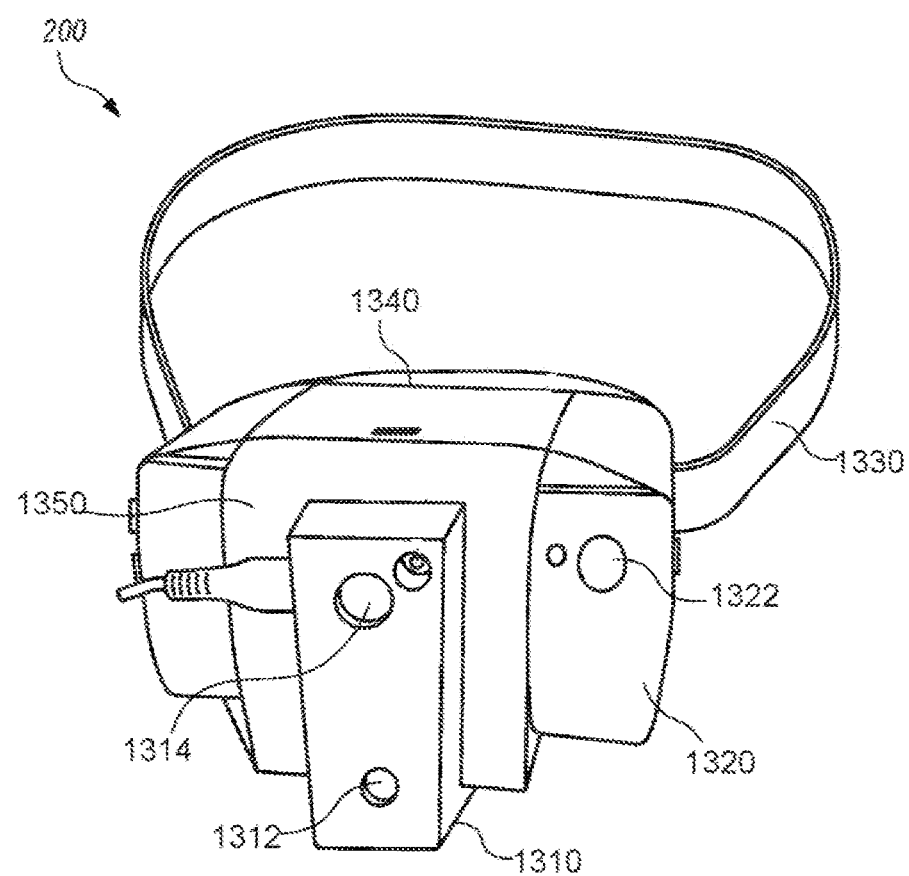
FIG. 13 is an example head mounted apparatus for a virtual reality system, in accordance with an embodiment.

FIG. 13 is an example head mounted apparatus 1310 for a virtual reality system. In the example of FIG. 13, the head mounted apparatus 1310 comprises a headset 1340 configured for use with a mobile device 1320 (e.g., a smartphone). The head mounted apparatus 1310 may include an illuminator 1312 (e.g., laser transmitter, infrared pattern illuminator) and a camera 1314 (e.g., an IR camera 214). A preprocessor included in the head mounted apparatus 1310 is configured to carry out initial image processing, such as described above in conjunction with FIG. 12. The head mounted apparatus 1310 is further configured to physically and electronically interface with the mobile device 1320 and the headset 1340. In various embodiments, the head mounted apparatus 1310 includes optics configured to transmit a display of the mobile device 1320, a sleeve 1350 configured to hold the mobile device 1310, which may include a camera 1322. A strap 1330 allows the head mounted apparatus 1310 to be secured to a user's head. The head mounted apparatus 1310 may interface with near eye displays in various embodiments.

The head mounted apparatus 1310 allows a virtual reality headset to be enhanced by allowing three-dimensional images of objects from an environment surrounding the head mounted apparatus 1310 (e.g., body parts of a user) to be viewed within a virtual reality scene. Hence, the head mounted apparatus 1310 provides hardware for coupling to a near eye display and executes instructions for controlling the head mounted apparatus 1310 and analyzing captured data. Some embodiments of the head mounted apparatus 1310 allow a virtual reality scene to be presented without a virtual reality-specific device.

Figure 14:
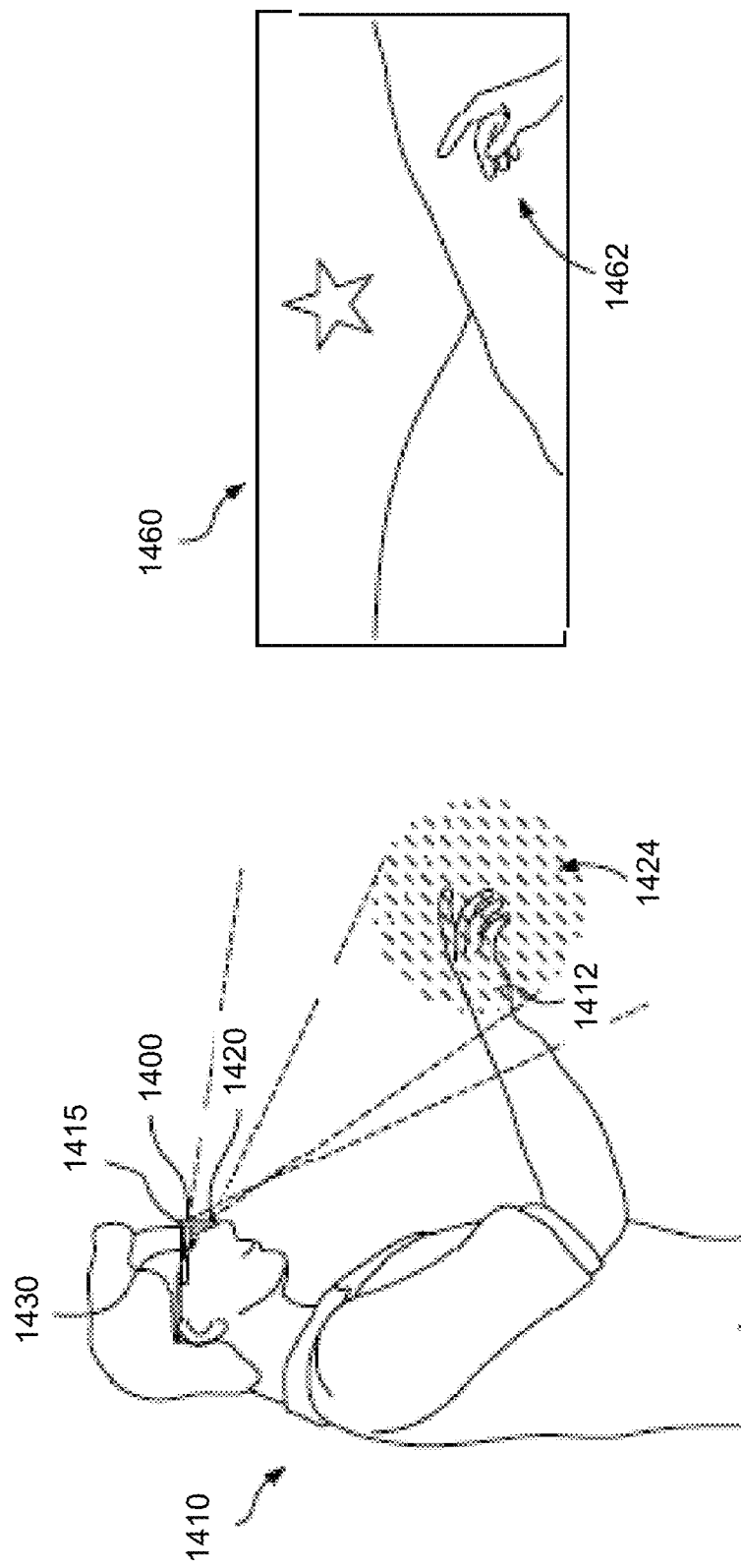
FIG. 14 is a conceptual diagram of using hand gestures to interact with a virtual reality environment, in accordance with an embodiment.

FIG. 14 a conceptual diagram of using hand gestures to interact with a virtual reality environment. The user 1410 wears a near eye display 1430 on which the device 1400 may be mounted, such as explained above in conjunction with FIG. 13. The device 1400 may include an illuminator (e.g., laser transmitter) 1420 and a capturing unit (e.g., camera) 1415 having a field of view wide enough to capture images of a volume surrounding the user. In operation, the near eye display 1430 is configured to project a synthetic scene onto both eyes of user 1410. Illuminator 1410 projects a light pattern 1424 into the volume surrounding the user 1410. Reflections of the light pattern 1410 captured by the capturing unit 1415 and then analyzed by a computer processor which may be located in the device 1400, in the near eye display 1430, or in any other suitable component. A visible light camera of the device 1400 is configured to capture two-dimensional images of the user's hands 1412 or of another object controlled by the user 1410. The processor of the device 1400 is configured to compute and to identify objects in the volume such as the user's hands 1412. In some embodiments, the processor is further configured to determine a depth map of the user's hands 1412 or of the gesturing object and may combine the depth map and the two-dimensional images into three-dimensional images of the user's hands 1412 that can may presented into a corresponding location 1462 in a virtual image 1460 presented to the user 1410. Thus, three-dimensional images of the user's hands 1410 are superimposed into the synthetic scene while preserving three-dimensional attributes of the user's hands 1410.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the invention be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   providing a light beam from a light source for projection into a volume;
   encoding the light beam with one or more predefined properties to apply a light pattern to the light beam;
   projecting the light beam encoded with the light pattern into the volume;
   detecting light from the light pattern reflected from the volume via a detector;
   analyzing the detected light from the light pattern reflected from the volume;
   segmenting an object in the volume from the volume according to a coherence characteristic of light detected from the light pattern reflected by the object by determining a difference between the coherence characteristic of the detected light from the light pattern reflected by the object and a coherence characteristic of the detected light from the light pattern reflected by the volume; and calibrating the light source to identify other objects in the volume with the same coherence characteristic of detected light from the light pattern reflected by the object.

2. The method of claim 1, wherein the light pattern comprises a plurality of stripes.

3. The method of claim 1, further comprising: generating depth information for the object based on the detected light from the light pattern reflected by the object.

4. The method of claim 1, further comprising:
identifying the object as an object of interest.

5. The method of claim 1, wherein the light pattern includes light properties selected from a group consisting of a collimation angle of a profile of the light beam, an intensity in the profile of the light beam, uniformity in the profile of the light beam, a coherence of the light source, and any combination thereof.

6. The method of claim 1, wherein the object in the volume is segmented based on a width of the detected light from the light pattern reflected by the object.

7. The method of claim 1, wherein the object in the volume is segmented based on a change in intensity profile of the detected light from the light pattern reflected by the object.

8. The method of claim 7, wherein the change in the intensity profile of the detected light comprises a change in a local uniformity profile of light from the light pattern reflected by the object.

9. The method of claim 7, wherein the change in the intensity profile of the detected light comprises a change in a speckle of light from the light pattern reflected by the object.

10. The method of claim 7, wherein the change in the intensity profile of the detected light comprises a change in a diffused or stray light profile of light from the light pattern reflected by the object.

11. The method of claim 1, wherein detecting light from the light pattern reflected from the volume via a detector comprises polarizing the light pattern reflected from the volume according to a polarization structure and an additional polarization structure to generate a plurality of images of light reflected from the volume, and segmenting the object in the volume from the volume comprises: subtracting an image of light reflected from the volume having the polarization structure from an additional image of light reflected from the volume having the additional polarization structure; and extracting the object from the subtracting.

12. The method of claim 1, further comprising: comparing a characteristic of light from the light pattern reflected by an additional object in the volume to the characteristic of light from the light pattern reflected by the object; and segmenting the additional object from the volume based on the comparing.

13. The method of claim 12, wherein the object is a face of a user and the additional object is a hand of the user.

14. An apparatus comprising:
a light source configured to produce a light beam;
at least one optical element configured to apply a predefined optical structure to the light beam, the predefined optical structure configured to vary according to a physical structure of an object;
a detector configured to obtain a plurality of images of the light beam reflected from a volume including the object; and
a processor configured to extract the object from the plurality of images based on at least one difference in a coherence characteristic of the predefined optical structure of the light beam reflected from the object relative to a coherence characteristic of the predefined optical structure of the light beam reflected from the volume including the object and to calibrate the light source to identify other objects in the volume with the same coherence characteristic of the predefined optical structure of the light beam reflected by the object.

15. The apparatus of claim 14, wherein the predefined optical structure applied to the light beam comprises a light pattern.

16. The apparatus of claim 15, further comprising:
a polarizer positioned in a field of view of the detector, the polarizer configured to polarize light from the light beam reflected from the volume according to at least two predefined polarization structures.

17. The apparatus of claim 16, wherein the processor is further configured to extract the object from the plurality of images by subtracting an image of the object having a polarization structure from an additional image of the object having a different polarization structure.

18. The apparatus of claim 14, wherein a difference in a coherence characteristic of the predefined optical structure of the light beam comprises a change in a width of the predefined optical structure reflected from the object relative to a width of the predefined optical structure reflected from the volume including the object.

19. The apparatus of claim 14, wherein a difference in a coherence characteristic of the predefined optical structure of the light beam comprises a change in a Gaussian cross-sectional intensity profile of the predefined optical structure reflected from the object relative to a Gaussian cross-sectional intensity profile of the predefined optical structure reflected from the volume including the object.

20. The apparatus of claim 14, a difference in a coherence characteristic of the predefined optical structure of the light beam comprises a change in a local uniformity profile of the predefined optical structure reflected from the object relative to a local uniformity profile of the predefined optical structure reflected from the volume including the object.

21. The apparatus of claim 14, wherein a difference in a coherence characteristic of the predefined optical structure of the light beam comprises a change in a speckle profile of the predefined optical structure reflected from the object relative to a speckle profile of the predefined optical structure reflected from the volume including the object.

* * * * *

UNITED STATES PATENT AND TRADEMARK OFFICE
CERTIFICATE OF CORRECTION

| | |
|---|---|
| PATENT NO. | : 10,049,460 B2 |
| APPLICATION NO. | : 15/052638 |
| DATED | : August 14, 2018 |
| INVENTOR(S) | : Nitay Romano et al. |

It is certified that error appears in the above-identified patent and that said Letters Patent is hereby corrected as shown below:

On the Title Page

Item (72), Column 1, in "Inventors", Line 9, add -- Yaniv Vinish, Sunnyvale, CA (US); --.

Signed and Sealed this
Thirteenth Day of September, 2022

Katherine Kelly Vidal
*Director of the United States Patent and Trademark Office*